H. A. ALLEN.
THROTTLE CONTROL.
APPLICATION FILED JUNE 25, 1914.

1,192,258.

Patented July 25, 1916.
2 SHEETS—SHEET 1.

WITNESSES:
Frank R Glore
H.C. Rodgers

INVENTOR
H.A.Allen
BY
George H. Thorpe
ATTORNEY

H. A. ALLEN.
THROTTLE CONTROL.
APPLICATION FILED JUNE 25, 1914.

1,192,258.

Patented July 25, 1916.
2 SHEETS—SHEET 2.

WITNESSES:
Frank R Glove
H. C. Rodgers

INVENTOR
H. A. Allen
George ...
ATTORNEY

UNITED STATES PATENT OFFICE.

HERBERT ARCHER ALLEN, OF WILLOW CREEK, MONTANA.

THROTTLE CONTROL.

1,192,258.  Specification of Letters Patent.  Patented July 25, 1916.

Application filed June 25, 1914. Serial No. 848,319.

*To all whom it may concern:*

Be it known that I, HERBERT A. ALLEN, a citizen of the United States, residing at Willow Creek, in the county of Gallatin and State of Montana, have invented certain new and useful Improvements in Throttle Controls, of which the following is a specification.

This invention relates to throttle controls for engine driven conveyances—such as automobiles—and my object is to produce electrically actuated means whereby a gradual adjustment of the throttle can be effected from the rear seat of a motor car if desired without interfering with or impairing the efficiency of the usual controlling device, i. e., the lever mounted on or adjacent to the steering wheel and under the sole control of the chauffeur.

Another object is to provide a construction and arrangement of parts which will permit of the adjustment of the throttle electrically either by an occupant of the tonneau or by the chauffeur.

To these ends the invention consists in certain novel and peculiar features of construction and organization as hereinafter described and claimed; and in order that it may be fully understood reference is to be had to the accompanying drawings, in which:—

Figure 1:
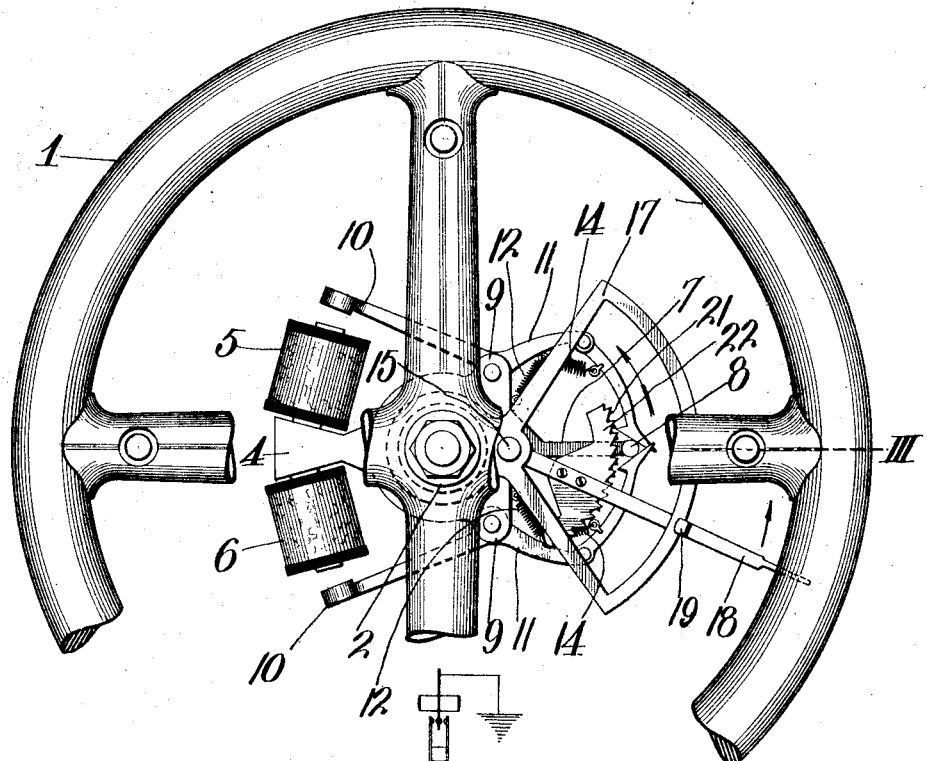
Figure 5:
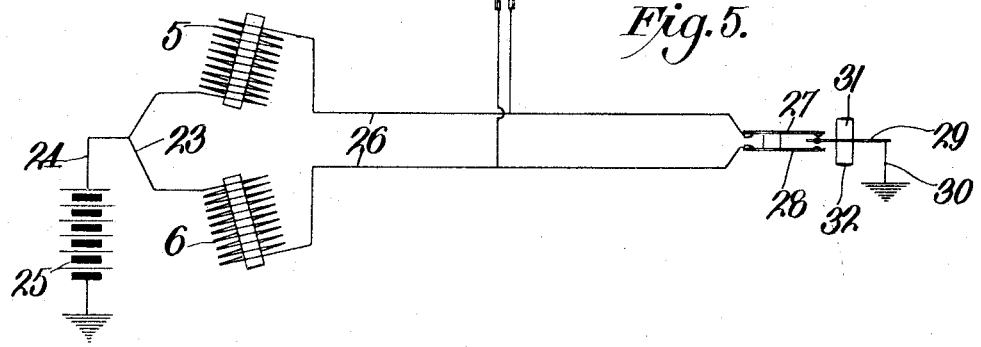
Figure 2:
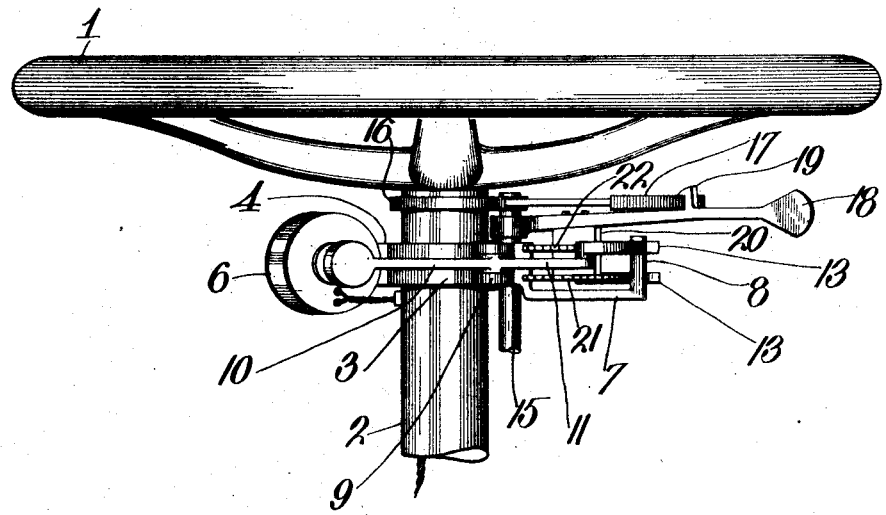
Figure 3:
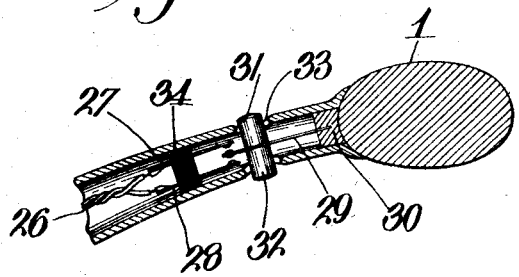
Figure 4:
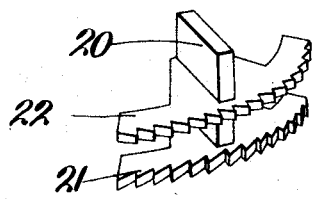

Figure 1, is a plan view of part of the steering wheel of a motor car and of throttle controlling mechanism embodying my invention. Fig. 2, is an elevation of the same. Fig. 3, is an enlarged section on the dotted line III of Fig. 1. Fig. 4, is a detailed perspective view of a double ratchet segment forming a part of the controlling appliance. Fig. 5, is a diagrammatic view showing the electric circuits.

In the said drawings, 1 is the steering wheel of a motor car and 2 the steering column thereof. 3 is a collar secured rigidly on said column and provided with a radially projecting arm 4 equipped at opposite sides with horizontally arranged electro-magnets 5 and 6. At the opposite side of the column from arm 4 the collar is equipped in a plane preferably below its lower edge with a radially projecting arm 7, terminating in an upright pin 8 and at opposite sides of said arm 7 the collar is provided with outwardly projecting sets of ears 9 between which are pivoted for movement in a horizontal plane, rock levers, each having an arm 10, one of which constitutes an armature for magnet 5 and the other of which constitutes an armature for magnet 6. Each rock lever is also provided with an arm 11 connected by a retractile spring 12 to a fixed point for the purpose of holding the armature arm withdrawn from the magnet.

Pivoted to the free ends of arms 11 of the rock levers, is a pair of pulling pawls 13, one located in a plane below its respective lever and the other in a plane above its respective lever but both normally held by retractile springs 14 against the pin 8, as shown most clearly in Fig. 1. Extending vertically through the collar in the radial plane of arm 7 is the throttle rod 15, the same projecting above the collar 3 and being journaled in a collar 16 mounted on the steering column, and provided with a segmental guide frame 17 for the throttle lever 18, arranged under said frame and secured rigidly to the throttle rod 15, for the purpose of turning the latter and thereby effecting an increase or diminution in the supply of explosive fluid admitted to the engine; said lever having a hook 19 for slidingly engaging the guide 17 and assisting through frictional engagement therewith in preventing accidental movement or adjustment of said lever. The lever is provided at a suitable point with a depending arm 20, and formed integrally with or secured to said arm 20 is a pair of segmental ratchets 21 and 22, the former occupying the horizontal plane of the pulling pawl attached to the rock lever which coöperates with electro-magnet 5 and the other ratchet segment occupying the horizontal plane of the pulling pawl carried by the lever which coöperates with electro-magnet 6, it being noted that the teeth of the ratchet segments 21 and 22 face in opposite directions in view of the fact that the pawls are adapted to pull in opposite directions under the action imparted to the rock levers by their respective electro-magnets.

Referring now to Fig. 5, it will be seen that the electro-magnets at one end are grounded. In practice they will, of course, be grounded in the sense that they will be connected to the frame or other part of the car for establishing electrical connection between them. For convenience the electric circuit is shown as follows: 23 is a pair of conductors leading from the magnets 5 and 6 to a common wire 24, and in circuit with said wire 24 is a battery 25 or its equivalent. 26 are conductors leading from the opposite ends of the magnets to one or more electric switches which are shown as of the push button type, that is to say, comprise contacts 27 and 28 and a spring plate 29 arranged between and out of contact with contacts 27 and 28, the plate 29 being grounded by a conductor 30 and provided with a pair of insulated buttons 31 and 32. Fig. 5 shows the circuit as embodying two switches of the type described but it will be understood that there may be any desired number of these switches and they may be located at any convenient point, for instance, one may be located within reach of a person occupying the back seat of the car so that he may effect a decrease or increase in the speed of the car by completing a circuit through the proper magnet which, in a manner hereinafter explained, diminishes or increases the supply of explosive fluid as the case may be.

As the control of the throttle through the section of the electro-magnets is more perfect than through the operation of the throttle lever by hand, it may be desirable to provide the steering wheel with a plurality of the push button switches, as indicated in Fig. 1 and Fig. 3, so that the chauffeur may adjust the throttle ordinarily by the push buttons. The lever, of course, may be used when necessary or desirable.

Assuming that the parts are in the position shown in Fig. 1, and that the throttle is open, it will be seen that it may be closed in the usual manner, that is, by swinging the throttle lever in the direction indicated by the arrow without affecting the position of the rock levers or pulling pawls or either of them. In the event it is desired to impart closing movement to the throttle electrically, a passenger in the car or the chauffeur thereof may operate a push button to effect the energization of magnet 5 to cause the same to attract its armature and thereby operate the connected pawl in the direction indicated by the adjacent arrow, Fig. 1. As said pawl is thus moved its spring 14 swings it inwardly so that its tooth shall engage the lower segment and pull it in the same direction, which movement of course, is imparted to the throttle lever and therefore to the throttle, not shown. By reason of the fact that the pulling movement of the pawl is short it will be obvious that with each operation of the push button the throttle will be adjusted but slightly and that it will require successive operations of a push button to effect material adjustment of the throttle. For this reason it is obvious that adjustments of the throttle, through the operation of a push button, effect either a gradual increase or decrease in the supply of explosive mixture to the engine. The reverse operation of the push button, as will be readily understood by reference to the drawings, will result in the completion of a circuit through the other electro-magnet and therefore effect reverse action of the throttle lever, that is to say, will tend to impart such movement to said lever as will open the throttle.

By reference to Fig. 3 it will be seen that the push button switches can be applied to the steering wheel in a very convenient manner. In said figure the push buttons project slidingly through holes 33 in the spokes of the wheel, contact 29 being grounded through conductor 30 and the spoke of the wheel. The contacts 27 and 28, for engagement at times by contact 29, are mounted in a block 34 of insulation secured in the spoke.

From the above description it will be apparent that the occupant of a rear seat of a car may control the speed thereof without the necessity of instructing the chauffeur and that the chauffeur may also control the speed electrically if he desires, instead of grasping and moving the throttle lever, this being desirable not only because the speed of the car will be increased or diminished gradually through the necessity of repeatedly operating the push button, but because there is no necessity for him to loosen his grip on the steering wheel as required in hand manipulation of the throttle. Furthermore, by providing the steering wheel with a plurality of push buttons, as shown in Fig. 1, the chauffeur can conveniently use either hand for effecting a variation in the speed of the car without releasing his grip on the steering wheel, and leave the other hand free to shift the gears or apply the brake.

While I have illustrated the preferred embodiment of the invention, it is to be understood that I reserve the right to make such changes in the detail construction and arrangement of the parts as properly fall within the spirit and scope of the appended claims.

I claim:—

1. A throttle control, comprising a steering wheel column, a throttle rod carried adjacent thereto, a trip pin, a pair of electromagnets, rock levers constituting armatures for said magnets respectively, means for yieldingly holding the armatures withdrawn from the magnets, pawls carried by the armatures and normally held in inoperative position by said trip pin, a pair of oppositely toothed segments movable with the throttle rod, and yielding means for causing either of said pawls to engage one of said segments and impart rotative movement thereto and to the throttle rod, when one of the electro-magnets attracts the armature equipped with such pawl.

2. A throttle control, comprising a steering wheel column, a throttle rod carried adjacent thereto, a trip pin, a pair of electro-magnets, rock levers constituting armatures for said magnets respectively, means for yieldingly holding the armatures withdrawn from the magnets, pawls carried by the armatures and normally held in inoperative position by said trip pin, a pair of oppositely toothed segments movable with the throttle rod, and yielding means for causing either of said pawls to engage one of said segments and impart rotative movement thereto and to the throttle rod, when one of the electro-magnets attracts the armature equipped with such pawl; said pawl being adapted under the return movement of the armature when the magnet is de-energized to be tripped from engagement with the segment by the said pin.

3. A throttle control, comprising a steering wheel column, a throttle rod carried adjacent thereto, a trip pin, a pair of electro-magnets, rock levers constituting armatures for said magnets respectively, means for yieldingly holding the armatures withdrawn from the magnets, pawls carried by the armatures and normally held in inoperative position by said trip pin, a pair of oppositely toothed segments movable with the throttle rod, yielding means for causing either of said pawls to engage one of said segments and impart rotative movement thereto and to the throttle rod, when one of the electro-magnets attracts the armature equipped with such pawl, and one or more electric switches electrically connected with each of said magnets for energizing either of the same.

4. A throttle control, comprising a steering wheel column, a throttle rod carried adjacent thereto, a trip pin, a pair of electro-magnets, rock levers constituting armatures for said magnets respectively, means for yieldingly holding the armatures withdrawn from the magnets, pawls carried by the armatures and normally held in inoperative position by said trip pin, a pair of oppositely toothed segments movable with the throttle rod, yielding means for causing either of said pawls to engage one of said segments and impart rotative movement thereto and to the throttle rod, when one of the electro-magnets attracts the armature equipped with such pawl, electric connections for each of said magnets, and an electric switch adapted for movement in one direction to complete the circuit through one magnet and for movement in the opposite direction to complete the circuit through the other magnet.

5. A throttle control, comprising a steering wheel column, a throttle rod carried adjacent thereto, a trip pin, a pair of electro-magnets, rock levers constituting armatures for said magnets respectively, means for yieldingly holding the armatures withdrawn from the magnets, pawls carried by the armatures and normally held in inoperative position by said trip pin, a pair of oppositely toothed segments movable with the throttle rod, yielding means for causing either of said pawls to engage one of said segments and impart rotative movement thereto and to the throttle rod, when one of the electro-magnets attracts the armature equipped with such pawl, a source of electric energy in circuit with both magnets, a pair of contacts each in circuit with said source of electric energy through one of said magnets, another contact in circuit with said source of electric energy, and means for causing the last-named contact to engage either of the first-named contacts.

6. A throttle control, comprising a steering wheel column, a pair of electro-magnets supported therefrom, a pair of levers supported therefrom and constituting armatures for said electro-magnets, means yieldingly holding the armatures withdrawn from the magnet, a throttle rod suitably supported from the column, a handle projecting from the rod, a pair of segments secured to said handle and provided with oppositely fixed teeth, a fixed pin adjacent to said segments, a pair of pawls pivotally carried by said levers and adapted for operation in opposite directions and for engagement respectively with said segments, and normally held by said fixed pin out of engagement with said segments, springs tending to cause said pawls to engage said segments, and means for sending pulsations of current through either of said magnets to cause the same through the related pawl, to impart step-by-step movement to the adjacent segment and hence to the throttle rod.

7. The combination with a steering column and a throttle rod and handle for operating the same, of a pair of oppositely toothed segments secured to the handle, a pair of magnets supported from the column, a pair of levers constituting armatures for said magnets, springs holding the levers normally away from the magnets, pawls pivoted to the levers and projecting toward each other, springs tending to swing the pawls toward the segments, a pin normally preventing such movement of the pawls and adapted also to trip the pawls from engagement with the segments when the magnets are deënergized, push button switches carried by the steering wheel and electrically connected to the magnets, and a source of energy in circuit with the magnets and the push button switches whereby the operation of a switch in one direction or the other will complete a circuit through one of said magnets or the other to effect operation of the throttle rod.

In testimony whereof, I affix my signature, in the presence of two witnesses.

HERBERT ARCHER ALLEN.

Witnesses:
PEARL WALBERT,
JOHN WALBERT.

Copies of this patent may be obtained for five cents each, by addressing the "Commissioner of Patents, Washington, D. C."